(12) United States Patent
Jiang et al.

(10) Patent No.: US 11,517,882 B2
(45) Date of Patent: Dec. 6, 2022

(54) RUTHENIUM-BASED CATALYST FOR AMMONIA SYNTHESIS AND PREPARATION METHOD AND USE THEREOF

(71) Applicants: National Engineering Research Center of Chemical Fertilizer Catalyst, Fuzhou University, Fuzhou (CN); Petrochina Petrochemical Research Institute, Beijing (CN); Beijing Sanju Environmental Protection & New Materials Co., Ltd., Beijing (CN)

(72) Inventors: Lilong Jiang, Fuzhou (CN); Jun Ni, Fuzhou (CN); Jianxin Lin, Fuzhou (CN); Shengbao He, Beijing (CN); Ke Lin, Beijing (CN); Bingyu Lin, Fuzhou (CN); Xingyi Lin, Fuzhou (CN)

(*) Notice: Subject to any disclaimer, the term of this patent is extended or adjusted under 35 U.S.C. 154(b) by 111 days.

(21) Appl. No.: 16/875,725

(22) Filed: May 15, 2020

(65) Prior Publication Data
US 2021/0170369 A1 Jun. 10, 2021

(30) Foreign Application Priority Data
Dec. 6, 2019 (CN) .......................... 201911246502.1

(51) Int. Cl.
*B01J 23/58* (2006.01)
*B01J 23/64* (2006.01)
(Continued)

(52) U.S. Cl.
CPC ............... *B01J 23/63* (2013.01); *B01J 21/18* (2013.01); *B01J 23/04* (2013.01); *B01J 23/58* (2013.01);
(Continued)

(58) Field of Classification Search
CPC . B01J 23/462; B01J 23/58; B01J 23/63; B01J 35/0013; B01J 35/008
See application file for complete search history.

(56) References Cited

U.S. PATENT DOCUMENTS

| 2013/0264198 A1 | 10/2013 | Wang |
| 2019/0071312 A1* | 3/2019 | Tanaka .................. B01J 23/462 |
| 2020/0197911 A1* | 6/2020 | Beach ..................... B01J 23/22 |

FOREIGN PATENT DOCUMENTS

| CN | 1954910 A | 5/2007 |
| CN | 101053834 A | 10/2007 |

(Continued)

OTHER PUBLICATIONS

Machine translation of Jiang et al. (CN 105413683), publication date Mar. 23, 2016.*

(Continued)

*Primary Examiner* — Jun Li
(74) *Attorney, Agent, or Firm* — Verrill Dana, LLP; Robert L. Hover

(57) ABSTRACT

Disclosed is a ruthenium-based catalyst for ammonia synthesis, preparation method and use thereof. The ruthenium-based catalyst comprises Ru—Ba-A core-shell structure which comprises a ruthenium nanoparticle as a core covered with a first shell and a second shell sequentially, wherein the first shell consists of a barium nanoparticle, and the second shell consists of a metal oxide. The Ru—Ba-A core-shell structure can effectively preventing agglomerations of ruthenium nanoparticles during the use of the catalyst and avoiding direct contact between the ruthenium nanoparticles and the metal oxides. In addition, barium nanoparticles have a promoting effect as an electronic promoter, which can effectively improve the stability and catalytic activity of ruthe- (Continued)

nium-based catalyst for ammonia synthesis, especially in the system for synthesizing ammonia from a coal gas.

14 Claims, 5 Drawing Sheets

(51) Int. Cl.
| | |
|---|---|
| B01J 35/10 | (2006.01) |
| B01J 37/02 | (2006.01) |
| B01J 37/08 | (2006.01) |
| B01J 23/63 | (2006.01) |
| B01J 21/18 | (2006.01) |
| B01J 23/04 | (2006.01) |
| B01J 35/00 | (2006.01) |
| C01C 1/04 | (2006.01) |
| B01J 23/46 | (2006.01) |

(52) U.S. Cl.
CPC ......... *B01J 35/008* (2013.01); *B01J 35/0013* (2013.01); *B01J 35/1023* (2013.01); *B01J 35/1028* (2013.01); *B01J 35/1038* (2013.01); *B01J 35/1042* (2013.01); *B01J 37/0203* (2013.01); *B01J 37/0236* (2013.01); *B01J 37/086* (2013.01); *C01C 1/0411* (2013.01); *B01J 23/462* (2013.01)

(56) References Cited

FOREIGN PATENT DOCUMENTS

| | | |
|---|---|---|
| CN | 101053835 A | 10/2007 |
| CN | 101362080 A | 2/2009 |
| CN | 103706360 A | 4/2014 |
| CN | 104084197 A | 10/2014 |
| CN | 104785255 A | 7/2015 |
| CN | 105413683 A | 3/2016 |
| CN | 107185534 A | 9/2017 |
| CN | 108816221 A | 11/2018 |
| CN | 110038615 A | 7/2019 |
| CN | 110102313 A | 8/2019 |
| WO | 2011/160022 A1 | 12/2011 |
| WO | WO-2017205042 A2 * | 11/2017 ............. B01D 53/94 |

OTHER PUBLICATIONS

Iost et al. (Synthesis and Study of Ru—Ba—Cs/Sibunit Ternary Catalysts for Ammonia Synthesis, Russian Journal of Applied Chemistry, 2017, vol. 90, No. 6, pp. 887-894.).*
Plaksin et al. (Carbon Material from the Sibunit Family and Method for Controlling Their Properties, Solid Fuel Chemistry, 2014 vol. 48, No. 6, pp. 349-355).*
Kitano, Self-organized Ruthenium-Barium Core-Shell Nanoparticles on a Mesoporous Calcium Amide Matrix for Efficient Low-Temperature Ammonia Synthesis, Angew. Chem. Int. Ed. 2018, 57, 2648-2652.*
Liang, Graphitic Nanofilaments as Novel Support of Ru—Ba Catalysts for Ammonia Synthesis, Journal of Catalysis 211, 278-282, 2002 discloses using graphitic nanofilaments to support Ru—Ba catalyst, wherein the heating temperature for forming the core-shell catalyst being 400 ° C.*
First Office Action issued in priority CN application 201911246502. 1—dated Aug. 18, 2021—with English translation, 14 pages.
First Office Action issued in corresponding Canadian application 3075797—dated Jul. 5, 2021—4 pages.

* cited by examiner

__US 11,517,882 B2__

RUTHENIUM-BASED CATALYST FOR AMMONIA SYNTHESIS AND PREPARATION METHOD AND USE THEREOF

CROSS-REFERENCE TO RELATED APPLICATION

This application claims priority benefits to Chinese Patent Application No. 201911246502.1, filed on Dec. 6, 2019. The contents of the aforementioned application are incorporated herein by reference.

FIELD OF THE INVENTION

The present invention relates to the field of catalyst for ammonia synthesis, and in particular to a ruthenium-based catalyst for ammonia synthesis and a preparation method and use thereof.

BACKGROUND OF THE INVENTION

Ammonia is a main raw material for chemical fertilizers and basic organic industry, and thus ammonia synthesis industry plays an important role in agriculture and chemical industry. Over the years, the progress of ammonia synthesis industry is largely due to the improvement in the catalyst quality. Although the catalyst for ammonia synthesis accounts for a very small proportion in the process of ammonia synthesis, the catalyst directly affects the yield and economic benefits of ammonia synthesis.

Ruthenium-based catalyst for ammonia synthesis is considered as the second-generation catalyst for ammonia synthesis after the iron catalyst, and usually consists of a carrier, active metal ruthenium and a promoter, wherein the carrier is usually an activated carbon, a graphitized activated carbon and graphite, and the promoter is generally an oxide or a hydroxide of alkali metal, alkaline earth metal and rare earth metal. The ruthenium-based catalyst for ammonia synthesis is usually prepared by step impregnation with active ingredients and promoters, followed by drying.

For example, Chinese patent publication document CN101362080A discloses an activated carbon-supported ruthenium-based catalyst for ammonia synthesis and a preparation method thereof. The preparation method comprises the following steps: incipient impregnating activated carbon which is used as a carrier with an alkaline earth metal salt solution and drying, and then incipient impregnating with an aqueous solution of $RuCl_4$. Then adding alkaline oxalate solution to precipitate alkaline earth metal ions and $Ru^{4+}$, and washing with deionized water until no $Cl^-$ is detected in the washing solution, then drying, and incipient impregnating with an alkali metal salt solution or an alkaline solution. Then drying again to obtain a ruthenium-based catalyst for ammonia synthesis with activated carbon as a carrier, alkali metal and alkaline earth metal as a promoter, and $Ru(OH)_4$ or $RuO_2 \cdot 2H_2O$ as an active component ruthenium supported on the activated carbon carrier.

For the above ruthenium-based catalyst for ammonia synthesis, although ruthenium is highly dispersed on the surface of the activated carbon support and thus has a high utilization rate, this ruthenium-based catalyst for ammonia synthesis has poor stability and low catalytic performance which are especially worse in the system of ammonia synthesis from a coal gas.

SUMMARY OF THE INVENTION

A technical problem to be solved by the present invention is to overcome the shortcomings of poor stability and low catalytic performance of the catalyst for ammonia synthesis in the prior art. In this regard, the present invention provides a ruthenium-based catalyst for ammonia synthesis and a preparation method and use thereof.

In a first aspect, the present invention provides a ruthenium-based catalyst for ammonia synthesis, comprising Ru—Ba-A core-shell structure, the Ru—Ba-A core-shell structure comprising a ruthenium nanoparticle as a core which is covered with a first shell and a second shell sequentially, wherein the first shell consists of a barium nanoparticle, and the second shell consists of a metal oxide.

Preferably, the ruthenium-based catalyst further comprises a composite support which comprises a support member having an electron promoter dispersed on a surface of the support member, and the Ru—Ba-A core-shell structure being supported on the composite support.

Preferably, based on mass of the support member, the ruthenium nanoparticle accounts for 3 wt. % to 5 wt. %, metal ions in the barium nanoparticle and metal oxide account for 3 wt. % to 20 wt. %, and metal ions in the electron promoter account for 3% to 20%.

Preferably, the support member is a graphitized activated carbon support; and the electron promoter is an oxide of an alkali metal, preferably $K_2O$;

Preferably, the ruthenium-based catalyst is Ru—Ba-A-L/GC, wherein Ru represents a ruthenium nanoparticle, Ba represents a barium nanoparticle, A represents a metal oxide, L represents an electron promoter, GC represents a graphitized activated carbon support, and L/GC represents a composite support.

Preferably, the core has an average diameter of 2 nm to 5 nm, and the first shell and second shell have a total average thickness of 1 nm to 2 nm;

Preferably, the graphitized activated carbon support has a specific surface area of 800 $m^2/g$ to 1500 $m^2/g$ and a pore volume of 0.4 $cm^3/g$ to 0.8 $cm^3/g$.

Preferably, the metal oxide is barium oxide or a mixture of barium oxide and oxide $MO_X$, wherein M is a metal except for barium, and X is 1-2;

Preferably, the oxide $MO_X$ is at least one selected from the group consisting of $ZrO_2$, $TiO_2$, MgO, ZnO, $CeO_2$, $Al_2O_3$, $La_2O_3$ and $Sm_2O_3$.

In a second aspect, the present invention provides a method for preparing a ruthenium-based catalyst for ammonia synthesis, comprising the following steps:

impregnating a support member with a mixed aqueous solution of a ruthenium precursor, a water soluble salt of a metal and a water soluble salt of an electron promoter, and taking out the impregnated support member after the impregnating is completed; and successively drying and calcinating the impregnated support member in a reducing atmosphere to obtain a ruthenium-based catalyst for ammonia synthesis.

Preferably, the impregnating is incipient impregnation carried out at a temperature of 20° C. to 60° C.;

Preferably, the drying is carried out at a temperature of 110° C. to 120° C.; and Preferably, the calcinating comprises heating the impregnated support member after drying from a temperature of 110° C. to 120° C. to a temperature of 500° C. to 900° C. at a heating rate of 2-10° C./h, and then calcinating at 500° C. to 900° C.

Preferably, the calcinating lasts for 2 h to 60 h.

Preferably, the reducing atmosphere is a coal gas atmosphere comprising CO and $CO_2$ at a concentration of 5 ppm to 20 ppm;

Preferably, the mixed aqueous solution has a pH value of 0-2.

Preferably, every 100 g of the mixed aqueous solution contains 1-4 g ruthenium ions, and a mass ratio of the ruthenium ions to metal ions in the soluble salt of a metal oxide to metal ions in the soluble salt of the electron promoter is 1:(1.2 to 1):10.

Preferably, the method further comprises an aging step after the impregnating and prior to the drying, and the aging step is carried out at a temperature of 20° C. to 30° C. for a period of 2 h to 12 h.

Preferably, the pH value of the mixed aqueous solution is adjusted with one or more acids selected from the group consisting of nitric acid, acetic acid, oxalic acid, citric acid and tartaric acid; and/or, preferably, the ruthenium precursor is a chlorine-free water-soluble ruthenium precursor selected from the group consisting of ruthenium acetate, ruthenium nitrosyl nitrate, ruthenium ammonia complex and any combination thereof and/or, preferably, the soluble salt of the metal and the soluble salt of the electron promoter are both selected from the group consisting of nitrate, acetate, citrate, oxalate and any combination thereof.

Preferably, the graphitized activated carbon is prepared by: pulverizing an activated carbon into powders of 15-20 meshes, placing the powders in an intermediate frequency furnace wherein the powders are treated at 1800-2000° C. for 2-10 h under an argon atmosphere, followed by cooling the powders under the argon atmosphere to room temperature, and then oxidizing the powders in air at 400-450° C. to enlarge pores, thereby obtaining a graphitized activated carbon.

In a third aspect, the present invention also provides a method for ammonia synthesis from a coal gas, comprising carrying out ammonia synthesis from a coal gas in the presence of the above ruthenium-based catalyst or a ruthenium-based catalyst prepared by the above method in ammonia synthesis from a coal gas.

The present invention has the following beneficial effects:

1. The ruthenium-based catalyst for ammonia synthesis of the present invention comprises Ru—Ba-A core-shell structure, the Ru—Ba-A core-shell structure comprising a ruthenium nanoparticle as a core which is covered with a first shell and a second shell sequentially, wherein the first shell consists of a barium nanoparticle, and the second shell consists of a metal oxide. By studies the inventors found the existing ruthenium-based catalysts for ammonia synthesis have the shortcomings of poor stability and low catalytic performance, and the reason is that ruthenium nanoparticles and metal oxides have a small contacting area, so the metal oxides cannot well coat ruthenium nanoparticles, thus ruthenium nanoparticles are easy to aggregate during the use of the catalyst, which reduces the catalytic performance of the catalyst and also results in poor stability of the catalyst. Even if the metal oxides can well coat the ruthenium nanoparticles, under the catalysis of the ruthenium nanoparticles the metal oxides in the catalyst will repeatedly react with water vapor formed by methanation of trace amounts of CO and $CO_2$ gas present in the system of ammonia synthesis from a coal gas, and thus the structural stability and electron-donating ability of the metal oxides become worse, which further reduces the catalytic performance and stability of the catalyst. In the present invention, firstly, the ruthenium-based catalyst for ammonia synthesis is designed to comprise Ru—Ba-A core-shell structure, which comprises ruthenium nanoparticles as a core covered with barium nanoparticles and metal oxides from inside to outside. In this manner, the agglomeration of ruthenium nanoparticles are effectively prevented during the use of the catalyst and thus the catalytic performance of the catalyst is improved. Secondly, barium nanoparticles can improve the catalytic activity of the catalyst. Thirdly, the ruthenium nanoparticles are prevented from directly contacting the metal oxides, so the metal oxides will not react repeatedly with the water vapor formed by the methanation of CO and/or $CO_2$ in the presence of the ruthenium nanoparticles, thereby avoiding decrease in catalytic performance and stability of the catalyst, thus the defects of low catalytic performance and poor stability of the catalyst is completely solved.

2. The ruthenium-based catalyst for ammonia synthesis of the present invention comprises specific contents of ruthenium nanoparticles, barium nanoparticles and metal oxides covered on the surface of the ruthenium nanoparticles, and electron promoter, thereby avoiding direct contact between ruthenium nanoparticles and the activated carbon support, so as to improve the anti-methanization ability of the support, and further improve the stability and catalytic activity of the catalyst.

3. The ruthenium-based catalyst for ammonia synthesis of the present invention has specific diameter of the core and specific average thickness of the shell, thereby further improving the stability of the core-shell structure, and thus improving the stability and catalytic activity of the ruthenium-based catalyst for ammonia synthesis.

4. The ruthenium-based catalyst for ammonia synthesis of the present invention limits the specific surface area and pore volume of the graphitized activated carbon support, thereby highly dispersing the active component ruthenium nanoparticles and promoters, so that the Ru—Ba-A core-shell structure is stable, and the catalyst has high activity and stability.

5. In the method for preparing a ruthenium-based catalyst for ammonia synthesis of the present invention, a support member is impregnated with a mixed aqueous solution of a ruthenium precursor, a water soluble salt of a metal and a water soluble salt of an electron promoter, so that each component can be uniformly dispersed on the carrier, i.e. highly dispersed on the carrier. When heating the impregnated support member in a reducing atmosphere, the ruthenium precursor will be firstly reduced to ruthenium nanoparticles, and then the water-soluble salts of other oxides will reach a molten state to cover the ruthenium nanoparticles and are then oxidized to form corresponding metal oxides. Moreover, barium oxide in contact with the ruthenium nanoparticles will be reduced to barium nanoparticles under the catalysis of ruthenium nanoparticles. As the temperature continues to rise, the electron promoter will reach a flow state and then is separated from other oxides and spreads on the surface of the carrier. The final produced ruthenium-based catalyst for ammonia synthesis comprises stable Ru—Ba-A core-shell structure, comprising ruthenium nanoparticles as a core sequentially covered with barium nanoparticles and metal oxides from inside to outside, which can effectively prevent agglomeration of ruthenium nanoparticles during use, and meanwhile prevent direct contact between the ruthenium nanoparticles and the metal oxide, thereby effectively preventing the metal oxides from repeatedly reacting with the water vapor formed by the methanation of CO and/or $CO_2$ under the catalysis of the ruthenium nanoparticles. In addition, contact between the ruthenium nanoparticles and the carrier can be avoided, thereby improving the anti-methanization ability of the carrier, and improving the stability and catalytic activity of the catalyst. Furthermore, a chlorine-free water-soluble ruthenium precursor is preferred in the present invention. It is found that chloride ions are difficult to be removed in subsequent washing process or even if removed the core-shell structure in the catalyst is destroyed, which will affect the stability and catalytic activity of the catalyst. This problem is solved in the present invention by adopting a chlorine-free water-soluble ruthenium precursor.

6. The method for preparing a ruthenium-based catalyst for ammonia synthesis limits specific heating rate, temperature and time for calcinating, thereby further improving the stability of the core-shell structure.

7. The method for preparing a ruthenium-based catalyst for ammonia synthesis can save energy consumption and resources by performing high-temperature treatment in a coal gas atmosphere.

8. The method for preparing a ruthenium-based catalyst for ammonia synthesis further comprises an aging step after the impregnating and prior to the drying, and the aging time is limited, thus improving the stability and catalytic activity of the catalyst. It is found that after the impregnating, most of ruthenium precursors and soluble salts of metal oxides are in an amorphous state, which are unstable and will encounter deformation and shifting in the subsequent processing and thus affect the stability of the catalyst. By aging for a certain period of time, the catalyst can reach a certain stable state and the interaction between the components is enhanced, thereby improving the activity and stability of the catalyst, and thus improving the long cycle life of the catalyst.

9. The method for preparing a ruthenium-based catalyst for ammonia synthesis limits the pH value of a mixed solution of a chlorine-free water-soluble ruthenium precursor and a water-soluble salt of metal oxides. It is found that large viscosity of the mixed solution will result in poor dispersion and thus affect the stability and catalytic activity of the catalyst. This problem is solved by limiting the pH value of the mixed solution in a specific range as defined in the present invention.

BRIEF DESCRIPTION OF THE DRAWINGS

In order to more clearly illustrate the specific embodiments of the present invention or the technical solutions in the prior art, the drawings used in the specific embodiments or the description of the prior art will be briefly introduced below. Obviously, the drawings given below are some embodiments of the present invention. For those of ordinary skill in the art, other drawings can be obtained based on these drawings without paying creative work.

FIG. 6A shows a TEM of the catalyst of Embodiment 1. The graph at the right shows the particle size distribution of the catalyst. FIG. 6B shows a TEM of the catalyst of Embodiment 5. The graph at the right shows the particle size distribution of the catalyst. FIG. 6C shows a TEM of the catalyst of Embodiment 11. The graph at the right shows the particle size distribution of the catalyst. FIG. 6D shows a TEM of the catalyst of Comparative Example 3. The graph at the right shows the particle size distribution of the catalyst.

DETAILED DESCRIPTION OF THE EMBODIMENTS

Figure 1:
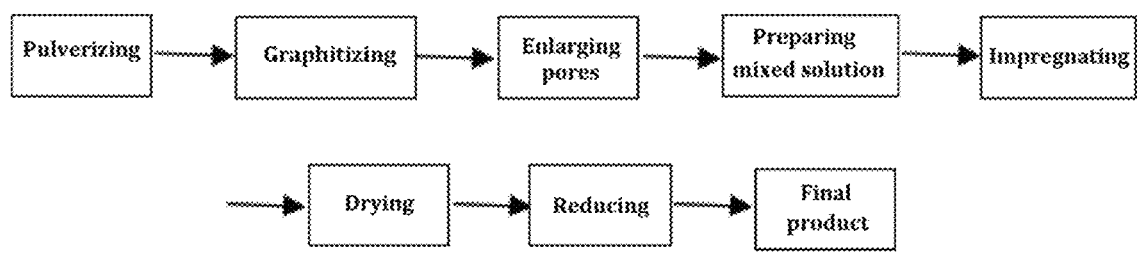
FIG. 1 shows a flowchart of a method for preparing a ruthenium-based catalyst for ammonia synthesis provided in the present invention.

The following embodiments are provided to further understand but not to limit the present invention. The present invention is not limited to the preferred embodiments. All products that are identical or similar to the present invention, obtained by any person under enlightenment of the present invention or by combing features of the present invention with prior art, fall within the protection scope of the present invention.

If specific experimental steps or conditions are not indicated in embodiments, such steps can be implemented according to operations or conditions of the conventional experimental steps described in the literature in the art. Reagents or instruments adopted, whose manufacturers are not indicated, are conventional reagent products which are commercially available.

Embodiment 1

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 $m^2$/g and a pore volume of 0.5 $cm^3$/g.

Preparation of a mixed solution: adding ruthenium nitrosyl nitrate, barium nitrate, cerium nitrate, and potassium nitrate with a mass ratio of ruthenium to barium to cerium to potassium of 2:3:1:3 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 8° C./h in a coal gas comprising CO and $CO_2$ at a concentration of 20 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$CeO_2$)—$K_2$O/GC, comprising Ru—Ba—(BaO—$CeO_2$) core-shell structure, wherein, the ruthenium nanoparticles have an average diameter of 2.5 nm, and the barium nanoparticles, barium oxide and cerium oxide have a total average thickness of 1 nm.

ICP measurement shows that, based on mass of the graphitized activated carbon support, in the above ruthenium-based catalyst for ammonia synthesis, the ruthenium nanoparticles account for 4 wt. %, barium ions in barium oxide and cerium ions in cerium oxide account for 8 wt. %, and potassium ions in potassium oxide account for 6 wt. %.

Embodiment 2

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 $m^2$/g and a pore volume of 0.5 $cm^3$/g.

Preparation of a mixed solution: adding ruthenium nitrosyl nitrate, barium nitrate, cerium nitrate, and potassium nitrate with a mass ratio of ruthenium to barium to cerium to potassium of 2:3:1:3 to deionized water, stirring well, and adjusting the pH value of the solution to 2 with acetic acid.

Preparation of a catalyst: incipient impregnating 10 g of the above graphitized activated carbon support with the above prepared mixed solution at 60° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 3° C./h in a coal gas comprising CO and $CO_2$ at a concentration of 20 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$CeO_2$)—$K_2$O/GC, comprising Ru—Ba—(BaO—$CeO_2$) core-shell structure, wherein the ruthenium nanoparticles have an average diameter of 2 nm, and the barium nanoparticles, barium oxide, and cerium oxide have a total average thickness of 1 nm.

ICP measurement shows that, based on mass of the graphitized activated carbon support, the ruthenium nanoparticles account for 3 wt. %, barium ions in barium oxide, and cerium ions in cerium oxide account for 6 wt. %, and potassium ions in potassium oxide account for 4.5 wt. %.

Embodiment 3

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 $m^2$/g and a pore volume of 0.5 $cm^3$/g.

Preparation of a mixed solution: adding ruthenium nitrosyl nitrate, barium nitrate, cerium nitrate, and potassium nitrate with a mass ratio of ruthenium to barium to cerium to potassium of 3:6:2:6 to deionized water, stirring well, and adjusting the pH value of the solution to 1 with nitric acid.

Preparation of a catalyst: incipient impregnating 10 g of the above graphitized activated carbon support with the above prepared mixed solution at 40° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 9° C./h in a coal gas comprising CO and $CO_2$ at a concentration of 20 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$CeO_2$)—$K_2$O/GC, comprising Ru—Ba—(BaO—$CeO_2$) core-shell structure, wherein, the ruthenium nanoparticles have an average diameter of 5 nm, and the barium nanoparticles, barium oxide, and cerium oxide have a total average thickness of 1 nm.

ICP measurement shows that, based on mass of the graphitized activated carbon support, in the above ruthenium-based catalyst for ammonia synthesis, the ruthenium nanoparticles account for 3 wt. %, barium nanoparticles, barium ions in barium oxide, and cerium ions in cerium oxide account for 8 wt. %, and potassium ions in potassium oxide account for 6 wt. %.

Embodiment 4

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 2000° C. for 5 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 1000 $m^2$/g and a pore volume of 0.6 $cm^3$/g.

Preparation of a mixed solution: adding ruthenium nitrosyl nitrate, barium nitrate, lanthanum nitrate, and potassium nitrate with a mass ratio of ruthenium to barium to lanthanum to potassium of 2:4:1:3 to deionized water, stirring well, and adjusting the pH value of the solution to 2 with nitric acid and acetic acid.

Preparation of a catalyst: incipient impregnating 10 g of the above graphitized activated carbon support with the above prepared mixed solution at 30° C. for 3 times, and each time lasts for 10 min. After the impregnating is completed, aging at 30° C. for 8 h, and drying in an oven at 110° C. After drying, placing the sample in a tube furnace, and heating from 110° C. to a temperature of 500° C. at a heating rate of 7° C./h in a coal gas comprising CO and $CO_2$ at a concentration of 15 ppm, then calcinating at a constant temperature for 60 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$La_2O_3$)—$K_2O$/GC, comprising Ru—Ba—(BaO—$La_2O_3$) core-shell structure, wherein, the ruthenium nanoparticles have an average diameter of 3 nm, and the barium nanoparticles, barium oxide and lanthanum oxide have a total average thickness of 1.5 nm.

ICP measurement shows that, based on mass of the graphitized activated carbon support, in the above ruthenium-based catalyst for ammonia synthesis, the ruthenium nanoparticles account for 4 wt. %, barium nanoparticles, barium ions in barium oxide, and lanthanum ions in lanthanum oxide account for 10 wt. %, and potassium ions in potassium oxide account for 6 wt. %.

Embodiment 5

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1850° C. for 10 h in an argon atmosphere, followed by cooling the powders to room temperature in the argon atmosphere, and then oxidizing the powders in air at 430° C. to enlarge pores, thereby obtaining a graphitized activated carbon, which has a specific surface area of 1500 $m^2$/g and a pore volume of 0.8 $cm^3$/g.

Preparation of a mixed solution: adding ruthenium nitrosyl nitrate, barium nitrate, titanium nitrate, and potassium nitrate with a mass ratio of ruthenium to barium to titanium to potassium of 2:4:1:5 to deionized water, stirring well, and adjusting the pH value of the solution to 1 with nitric acid, acetic acid and tartaric acid.

Preparation of a catalyst: incipient impregnating 10 g of the above graphitized activated carbon support with the above prepared mixed solution at 50° C. for 5 times, and each time lasts for 9 min. After the impregnating is completed, aging at 30° C. for 10 h, and drying in an oven at 115° C. After drying, placing the sample in a tube furnace, and heating from 115° C. to a temperature of 900° C. at a heating rate of 4° C./h in a coal gas comprising CO and $CO_2$ at a concentration of 5 ppm, then calcinating at a constant temperature for 2 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$TiO_2$)—$K_2O$/GC, comprising Ru—Ba—(BaO—$TiO_2$) core-shell structure, wherein, the ruthenium nanoparticles have an average diameter of 3.5 nm, and the barium nanoparticles, barium oxide, and titanium oxide have a total average thickness of 2 nm.

ICP measurement shows that, based on mass of the graphitized activated carbon support, in the above ruthenium-based catalyst for ammonia synthesis, the ruthenium nanoparticles account for 4 wt. %, barium nanoparticles, barium ions in barium oxide and titanium ions in titanium oxide account for 10 wt. %, and potassium ions in potassium oxide account for 10 wt. %.

Embodiment 6

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1900° C. for 6 h in an argon atmosphere, followed by cooling the powders to room temperature in the argon atmosphere, and then oxidizing the powders in air at 420° C. to enlarge pores, thereby obtaining a graphitized activated carbon, which has a specific surface area of 1200 $m^2$/g and a pore volume of 0.4 $cm^3$/g.

Preparation of a mixed solution: adding ruthenium nitrosyl nitrate, barium nitrate, aluminum nitrate, and potassium nitrate with a mass ratio of ruthenium to barium to aluminum to potassium of 3:6:2:6 to deionized water, stirring well, and adjusting the pH value of the solution to 0 with nitric acid and citric acid.

Preparation of a catalyst: incipient impregnating 10 g of the above graphitized activated carbon support with the above prepared mixed solution at 25° C. for 6 times, and each time lasts for 8 min. After the impregnating is completed, aging at 25° C. for 2 h, and drying in an oven at 120° C. After drying, placing the sample in a tube furnace, and heating from 120° C. to a temperature of 700° C. at a heating rate of 6° C./h in a coal gas comprising CO and $CO_2$ at a concentration of 20 ppm, then calcinating at a constant temperature for 30 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$Al_2O_3$)—$K_2O$/GC, comprising Ru—Ba—(BaO—$Al_2O_3$) core-shell structure, wherein, the ruthenium nanoparticles have an average diameter of 4 nm, and the barium nanoparticles, barium oxide, and aluminium oxide have a total average thickness of 1 nm.

ICP measurement shows that, based on mass of the graphitized activated carbon support, in the above ruthenium-based catalyst for ammonia synthesis, the ruthenium nanoparticles account for 3 wt. %, barium nanoparticles, barium ions in barium oxide and aluminum ions in aluminium oxide account for 8 wt. %, and potassium ions in potassium oxide account for 6 wt. %.

Embodiment 7

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1900° C. for 6 h in an argon atmosphere, followed by cooling the powders to room temperature in the argon atmosphere, and then oxidizing the powders in air at 420° C. to enlarge pores, thereby obtaining a graphitized activated carbon, which has a specific surface area of 1200 $m^2$/g and a pore volume of 0.4 $cm^3$/g.

Preparation of a mixed solution: adding ruthenium nitrosyl nitrate, barium nitrate, aluminium nitrate, cerium nitrate, and potassium nitrate with a mass ratio of ruthenium to barium to aluminum to cerium to potassium of 2:3:1:1:3 to deionized water, stirring well, and adjusting the pH value of the solution to 2 with nitric acid and citric acid.

Preparation of a catalyst: incipient impregnating 10 g of the above graphitized activated carbon support with the above prepared mixed solution at 45° C. for 6 times, and each time lasts for 8 min. After the impregnating is completed, aging at 28° C. for 2 h, and drying in an oven at 120° C. After drying, placing the sample in a tube furnace, and heating from 120° C. to a temperature of 700° C. at a heating rate of 8° C./h in a coal gas comprising CO and $CO_2$ at a concentration of 20 ppm, then calcinating at a constant temperature for 15 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$Al_2O_3$—$CeO_2$)—$K_2O$/GC, comprising Ru—Ba—(BaO—$Al_2O_3$—$CeO_2$) core-shell structure, wherein, the ruthenium nanoparticles have an average diameter of 2.5 nm, and the barium nanoparticles, barium oxide, cerium oxide, and aluminium oxide have a total average thickness of 1.8 nm.

ICP measurement shows that, based on mass of the graphitized activated carbon support, in the above ruthenium-based catalyst for ammonia synthesis, the ruthenium nanoparticles account for 5 wt. %, barium nanoparticles, barium ions in barium oxide, aluminum ions in alumina and cerium ions in cerium oxide account for 12.5 wt. %, and potassium ions in potassium oxide account for 7.5 wt. %.

Embodiment 8

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 3 h in an argon atmosphere, followed by cooling the powders to room temperature in the argon atmosphere, and then oxidizing the powders in air at 410° C. to enlarge pores, thereby obtaining a graphitized activated carbon, which has a specific surface area of 1000 $m^2$/g and a pore volume of 0.4 $cm^3$/g.

Preparation of a mixed solution: adding ruthenium acetate, barium acetate, cerium acetate, and potassium acetate with a mass ratio of ruthenium to barium to cerium to potassium of 2:3:1:3 to deionized water, stirring well, and adjusting the pH value of the solution to 1 with nitric acid.

Preparation of a catalyst: incipient impregnating 10 g of the above graphitized activated carbon support with the above prepared mixed solution at 50° C. for 6 times, and each time lasts for 8 min. After the impregnating is completed, aging at 25° C. for 12 h, and drying in an oven at 120° C. After drying, placing the sample in a tube furnace, and heating from 120° C. to a temperature of 700° C. at a heating rate of 2° C./h in a coal gas comprising CO and $CO_2$ at a concentration of 5 ppm, then calcinating at a constant temperature for 6 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$CeO_2$)—$K_2O$/GC, comprising Ru—Ba—(BaO—$CeO_2$) core-shell structure, wherein, the ruthenium nanoparticles have an average diameter of 4.5 nm, and the barium nanoparticles, barium oxide and cerium oxide have a total average thickness of 1.2 nm.

ICP measurement shows that, based on mass of the graphitized activated carbon support, in the above ruthenium-based catalyst for ammonia synthesis, the ruthenium nanoparticles account for 4 wt. %, barium nanoparticles, barium ions in barium oxide, and cerium ions in cerium oxide account for 8 wt. %, and potassium ions in potassium oxide account for 6 wt. %.

Embodiment 9

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 8 h in an argon atmosphere, followed by cooling the powders to room temperature in the argon atmosphere, and then oxidizing the powders in air at 450° C. to enlarge pores, thereby obtaining a graphitized activated carbon, which has a specific surface area of 900 $m^2$/g and a pore volume of 0.6 $cm^3$/g.

Preparation of a mixed solution: adding ruthenium nitrosyl nitrate, barium nitrate, cerium nitrate, and potassium nitrate with a mass ratio of ruthenium to barium to cerium to potassium of 2:3:1:3 to deionized water, stirring well, and adjusting the pH value of the solution to 1 with nitric acid.

Preparation of a catalyst: incipient impregnating 10 g of the above graphitized activated carbon support with the above prepared mixed solution at 55° C. for 6 times, and each time lasts for 8 min. After the impregnating is completed, aging at 23° C. for 12 h, and drying in an oven at 120° C. After drying, placing the sample in a tube furnace, and heating from 120° C. to a temperature of 600° C. at a heating rate of 10° C./h in a coal gas comprising CO and $CO_2$ at a concentration of 5 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$CeO_2$)—$K_2O$/GC, comprising Ru—Ba—(BaO—$CeO_2$) core-shell structure, wherein, the ruthenium nanoparticles have an average diameter of 3.5 nm, and the barium nanoparticles, barium oxide, and cerium oxide have a total average thickness of 1.5 nm.

ICP measurement shows that, based on mass of the graphitized activated carbon support, in the above ruthenium-based catalyst for ammonia synthesis, the ruthenium nanoparticles account for 5 wt. %, barium nanoparticles, barium ions in barium oxide, and cerium ions in cerium oxide account for 10 wt. %, and potassium ions in potassium oxide account for 7.5 wt. %.

Embodiment 10

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, barium nitrate, and potassium nitrate with a mass ratio of ruthenium to barium to potassium of 2:3:3 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 8° C./h in a coal gas comprising CO and $CO_2$ at a concentration of 20 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—BaO—$K_2O$/GC, comprising Ru—Ba—BaO core-shell structure, wherein, the ruthenium nanoparticles have an average diameter of 2 nm, and the barium nanoparticles and barium oxide have a total average thickness of 1.2 nm.

ICP measurement shows that, based on mass of the graphitized activated carbon support, in the above ruthenium-based catalyst for ammonia synthesis, the ruthenium nanoparticles account for 4 wt. %, barium nanoparticles and barium ions in the barium oxide account for 6 wt. %, and potassium ions in potassium oxide account for 6 wt. %.

Embodiment 11

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, barium nitrate, and potassium nitrate with a mass ratio of ruthenium to barium to potassium of 2:1.5:1.5 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 8° C./h in a coal gas comprising CO and $CO_2$ at a concentration of 20 ppm, then calcinating at a constant temperature for 10 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—BaO—$K_2O$/GC, comprising Ru—Ba—BaO core-shell structure, wherein, the ruthenium nanoparticles have an average diameter of 3 nm, and the barium nanoparticles and barium oxide have a total average thickness of 1 nm.

ICP measurement shows that, based on mass of the graphitized activated carbon support, in the above ruthenium-based catalyst for ammonia synthesis, the ruthenium nanoparticles account for 4 wt. %, barium nanoparticles and barium ions in the barium oxide account for 3 wt. %, and potassium ions in potassium oxide account for 3 wt. %.

Embodiment 12

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 2000° C. for 5 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 1000 m²/g and a pore volume of 0.6 cm³/g.

Preparation of a mixed solution: adding ruthenium nitrosyl nitrate, barium nitrate, lanthanum nitrate, zinc nitrate, and potassium nitrate with a mass ratio of ruthenium to barium to lanthanum to zinc to potassium of 2:6:3:4:6 to deionized water, stirring well, and adjusting the pH value of the solution to 2 with nitric acid and acetic acid.

Preparation of a catalyst: incipient impregnating 10 g of the above graphitized activated carbon support with the above prepared mixed solution at 30° C. for 3 times, and each time lasts for 10 min. After the impregnating is completed, aging at 30° C. for 8 h, and drying in an oven at 110° C. After drying, placing the sample in a tube furnace, and heating from 110° C. to a temperature of 500° C. at a heating rate of 7° C./h in a coal gas comprising CO and $CO_2$ at a concentration of 15 ppm, then calcinating at a constant temperature for 60 h, and then cooling to obtain a ruthenium-based catalyst for ammonia synthesis.

The above ruthenium-based catalyst for ammonia synthesis is tested by TEM and XPS. The corresponding theoretical analysis shows that its composition is Ru—Ba—(BaO—$La_2O_3$—ZnO)—$K_2O$/GC, comprising Ru—Ba—(BaO—$La_2O_3$—ZnO) core-shell structure, wherein, the ruthenium nanoparticles have an average diameter of 5 nm, and the barium nanoparticles, barium oxide, and lanthanum oxide have a total average thickness of 2 nm.

ICP measurement shows that, based on mass of the graphitized activated carbon support, in the above ruthenium-based catalyst for ammonia synthesis, the ruthenium nanoparticles account for 3 wt. %, and the barium nanoparticles, barium ions in barium oxide, lanthanum ions in lanthanum oxide and zinc ions in zinc oxide account for 19.5 wt. %, and potassium ions in potassium oxide account for 9 wt. %.

Comparative Example 1 (Compared to Embodiment 1)

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, barium nitrate, cerium nitrate, and potassium nitrate with a mass ratio of ruthenium to barium to cerium to potassium of 2:3:1:3 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. to obtain a ruthenium-based catalyst for ammonia synthesis.

ICP measurement shows that, based on mass of the graphitized activated carbon support, the ruthenium nanoparticles account for 4 wt. %, barium nanoparticles, barium ions in barium oxide, and cerium ions in cerium oxide account for 8 wt. %, and potassium ions in potassium oxide account for 6 wt. %. TEM measurement shows that, ruthenium nanoparticles have an average diameter of 6 nm.

Comparative Example 2 (compared to Embodiment 1)

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, cerium nitrate, and potassium nitrate with a mass ratio of ruthenium to cerium to potassium of 2:1:3 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. After drying, placing the sample in a tube furnace, and heating from 120° C. to a temperature of 600° C. at a heating rate of 8° C./h in a coal gas comprising CO and $CO_2$ at a concentration of 20 ppm, then calcinating at a constant temperature for 10 h, and then cooling to obtain a ruthenium-based catalyst for ammonia synthesis.

ICP measurement shows that, based on mass of the graphitized activated carbon support, the ruthenium nanoparticles account for 4 wt. %, cerium ions in cerium oxide account for 2 wt %, and potassium ions in potassium oxide account for 6 wt %. TEM measurement shows that, ruthenium nanoparticles have an average diameter of 5 nm.

Comparative Example 3 (Compared to Embodiment 1)

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, barium nitrate, cerium nitrate, and potassium nitrate with a mass ratio of ruthenium to barium to cerium to potassium of 2:3:1:6 to deionized water, stirring well, and adjusting the pH value of the solution to 1 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. to obtain a ruthenium-based catalyst for ammonia synthesis.

ICP measurement shows that, based on mass of the graphitized activated carbon support, the ruthenium nanoparticles account for 4 wt. %, barium nanoparticles, barium ions in barium oxide, and cerium ions in cerium oxide account for 8 wt %, and potassium ions in potassium oxide account for 12 wt %. TEM measurement shows that, ruthenium nanoparticles have an average diameter of 5.5 nm.

Comparative Example 4 (Compared to Embodiment 1)

Provided is a ruthenium-based catalyst for ammonia synthesis, which is prepared as follows:

Preparation of a graphitized activated carbon support: pulverizing 20 g activated carbon into powders of 15-20 meshes and placing the powders in an intermediate frequency furnace wherein the powders are treated at 1800° C. for 2 h in an argon atmosphere, followed by cooling the powders to room temperature in the argon atmosphere, and then oxidizing the powders in air at 400° C. to enlarge pores, thereby obtaining a graphitized activated carbon, which has a specific surface area of 800 m²/g and a pore volume of 0.5 cm³/g.

Preparation of a mixed solution: adding ruthenium nitrosyl nitrate, barium nitrate, cerium nitrate, and potassium nitrate with a mass ratio of ruthenium to barium to cerium to potassium of 2:3:1:3 to deionized water, stirring well, and adjusting the pH value of the solution to 5 with nitric acid.

Preparation of a catalyst: incipient impregnating 10 g of the above graphitized activated carbon support with the above prepared mixed solution at 20° C. for 6 times, and each time lasts for 8 min. After the impregnating is completed, aging at 20° C. for 12 h, and drying in an oven at 120° C. to obtain a ruthenium-based catalyst for ammonia synthesis.

ICP measurement shows that, based on mass of the graphitized activated carbon support, the ruthenium nanoparticles account for 4 wt. %, barium nanoparticles, barium ions in barium oxide, and cerium ions in cerium oxide account for 8 wt %, and potassium ions in potassium oxide account for 6 wt %. TEM measurement shows that, ruthenium nanoparticles have an average diameter of 8 nm.

Test Example 1

The ruthenium-based catalyst for ammonia synthesis prepared in Embodiment 1 is heat treated and subjected to TEM, XPS, H2-TPD, N2-TPD, and CO pulse measurements.

The transmission electron microscope (TEM) characterization was carried out with a Tecnai G2F20 S-TWIN type transmission electron microscope instrument produced by FEI company in Netherlands, to observe the micro-morphology of the support and catalyst. The detailed steps are as follows: dispersing a powder sample in anhydrous ethanol under ultrasonic for 2 min, and sucking a small amount of the resulted solution with a capillary tube and dropping onto a copper grid with a carbon film on the surface. After the anhydrous ethanol was dried, putting the copper grid into the transmission electron microscope to perform TEM test.

Figure 2A:
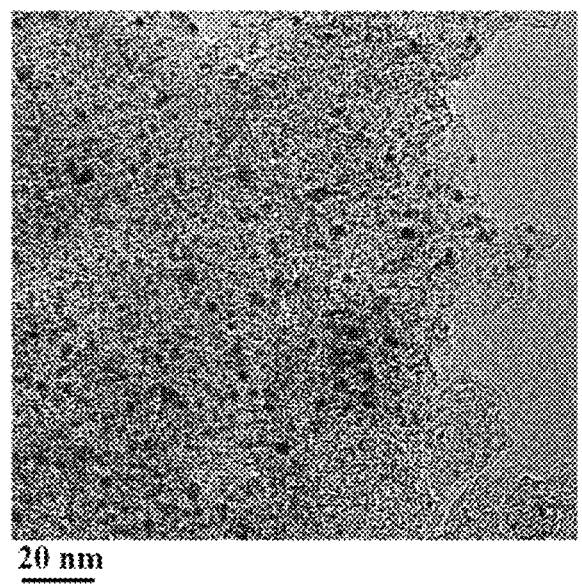
FIG. 2A shows transmission TEM images of a ruthenium-based catalyst for ammonia synthesis prepared in Embodiment 1 of the present invention after heating at 500° C. for 2 h.
Figure 2B:
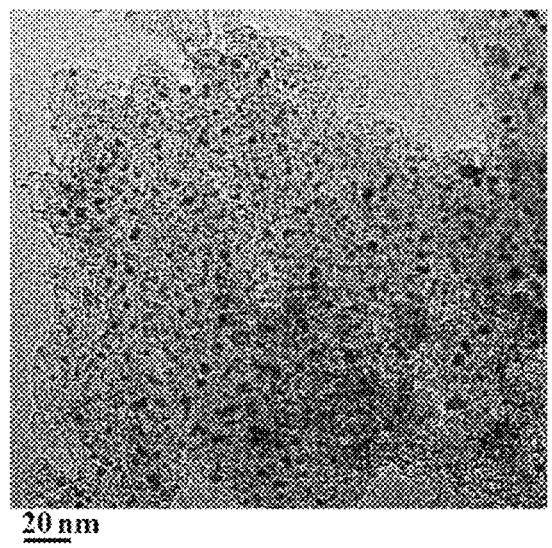
FIG. 2B shows transmission TEM images of a ruthenium-based catalyst for ammonia synthesis prepared in Embodiment 1 of the present invention after heating at 500° C. 20 h.

FIG. 2A and FIG. 2B show TEM images of the ruthenium-based catalyst for ammonia synthesis prepared in Embodiment 1 of the present invention after heating at 500° C. for 2 h (FIG. 2A) and 20 h (FIG. 2B); FIG. 2A and FIG. 2B show that, prolonging the heating time has little effect on the particle size of ruthenium nanoparticles, indicating that the catalyst has good stability.

Figure 6A:
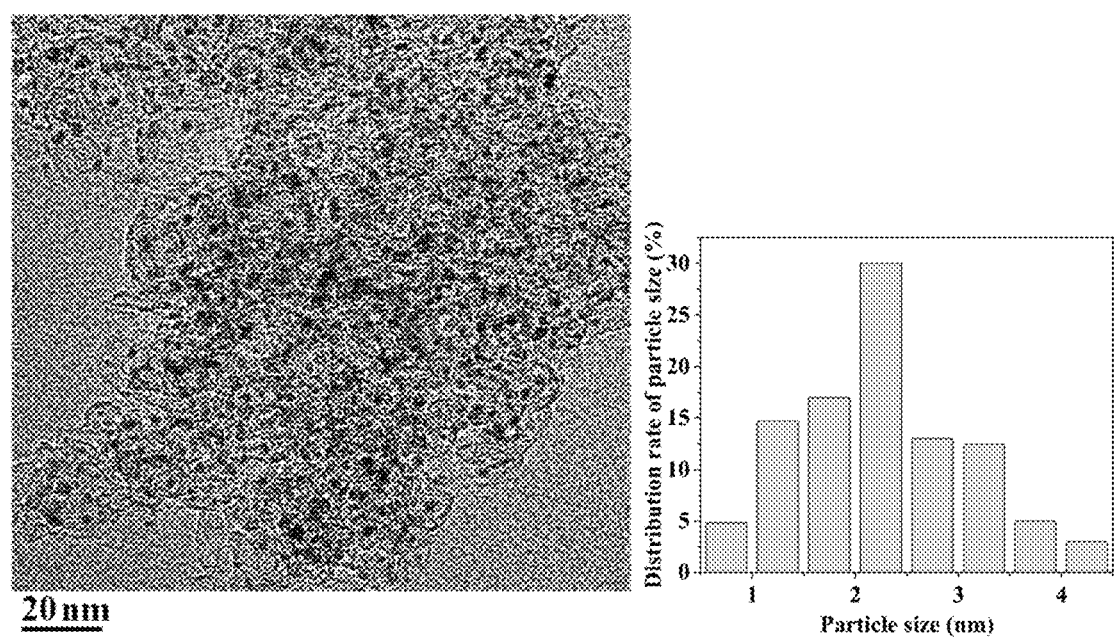
FIGS. 6A-6D show TEM images of ruthenium-based catalysts for ammonia synthesis with different potassium contents prepared in Embodiments 1, 5 and 11, and Comparative Example 3 after heating at 500° C. for 300 h.
Figure 6B:
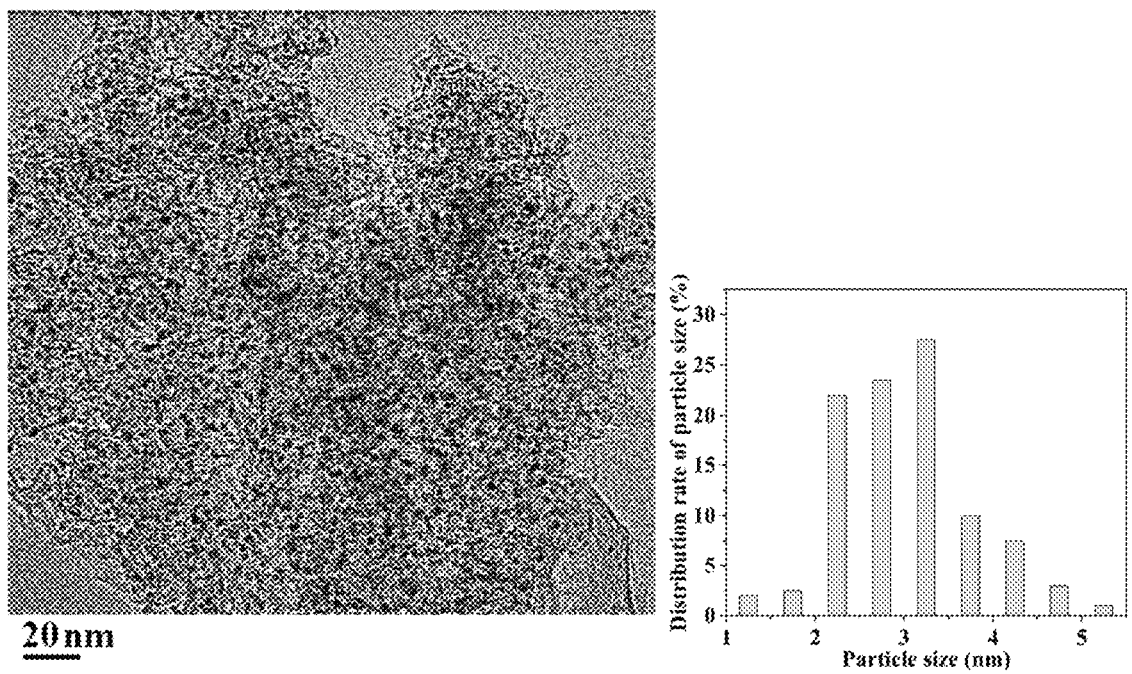
Figure 6C:
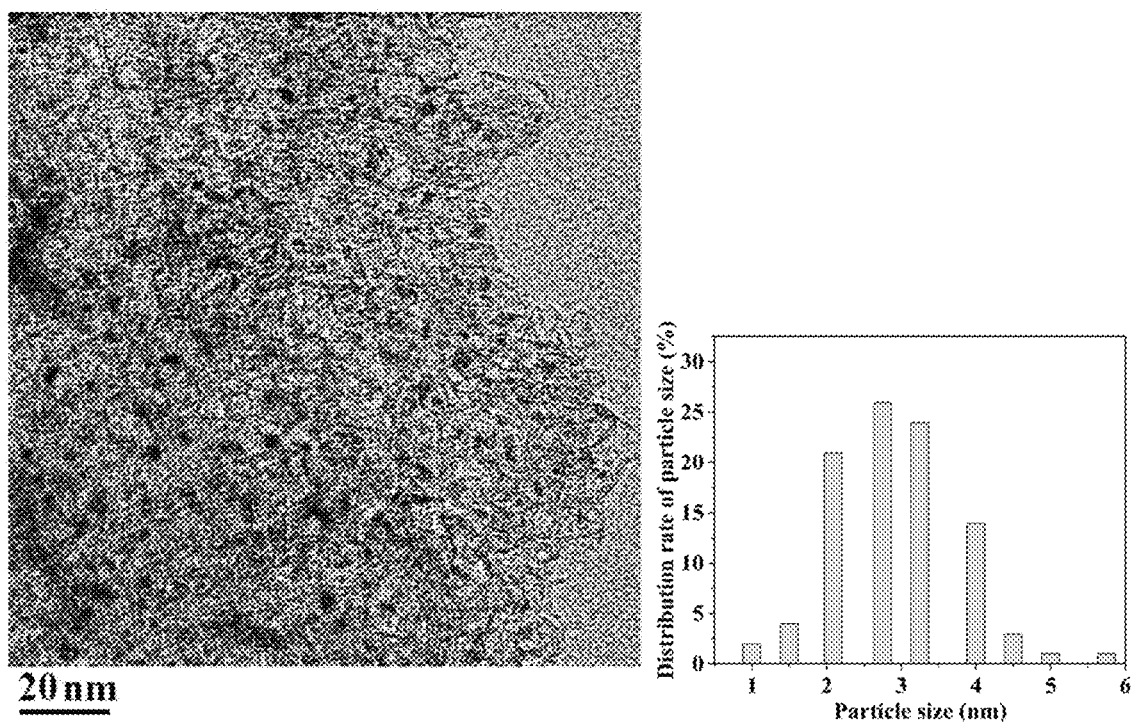
Figure 6D:
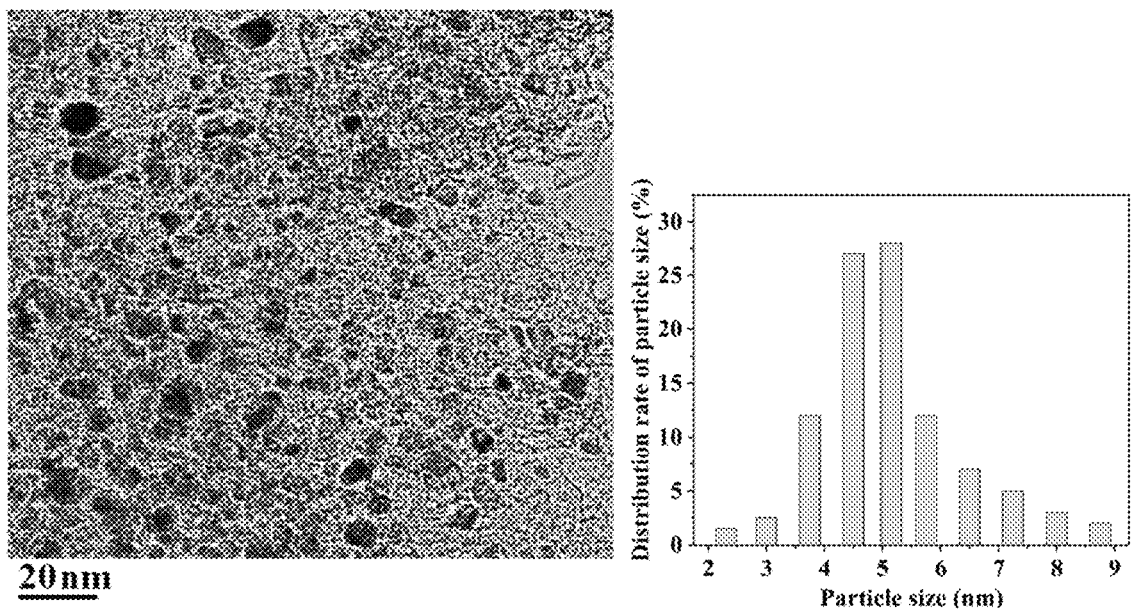

FIGS. 6A-6D show TEM images of the ruthenium-based catalyst for ammonia synthesis after heating at 500° C. for 300 h. FIG. 6A represents Embodiment 1, FIG. 6B represents Embodiment 5, FIG. 6C represents Embodiment 11, and FIG. 6D represents Comparative Example 3. It can be seen from FIGS. 6A-6D that the size of the ruthenium nanoparticles after heat treatment has a relationship with the content of potassium ions in the catalyst. When the content of potassium in the catalyst is 3-10 wt %, heat treatment has little effect on the particle size of ruthenium nanoparticles, and the core-shell structure has good stability; when the content of potassium in the catalyst is more than 10 wt. %, ruthenium nanoparticles are easily agglomerated at high temperature, indicating that the core-shell structure is unstable.

Figure 7:
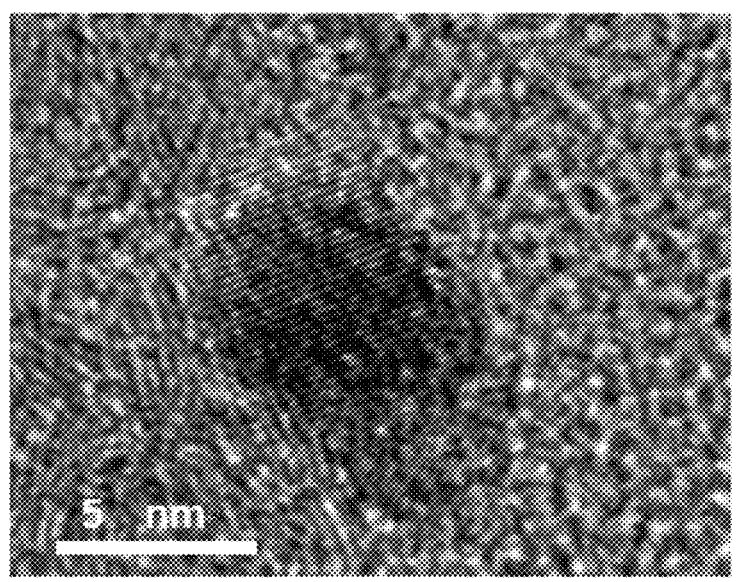
FIG. 7 shows a TEM image of a ruthenium-based catalyst for ammonia synthesis in Embodiment 1 of the present invention after heating at 500° C. for 20 h.

FIG. 7 shows a TEM image of the ruthenium-based catalyst for ammonia synthesis prepared in Embodiment 1 of the present invention after heating at 500° C. for 20 h. As can be seen from FIG. 7, even the catalyst is heat treated at 500° C. for 20 h, most of the ruthenium nanoparticles have a particle size of less than 5 nm and are covered by an promoter, and there is no sign of agglomeration, indicating that a core-shell structure is formed and it is stable.

XPS characterization is carried out with Quantum 2000 Scanning Esca Microprobe photoelectron spectrometer produced by Physical Electronics in America. The detailed steps are as follows: Al Kα rays is used as an excitation light source, hυ=1486.69 eV, excitation power is 22.8 W, and X-Ray beam spot is 200 um$^2$, the electron emission angle is 45.0°, the vacuum degree is maintained at $5 \times 10^{-7}$ Pa during analysis, and pass energy is 17.40 eV. The obtained electron binding energy results were corrected with C is (284.8 eV) spectrum.

Figure 5:
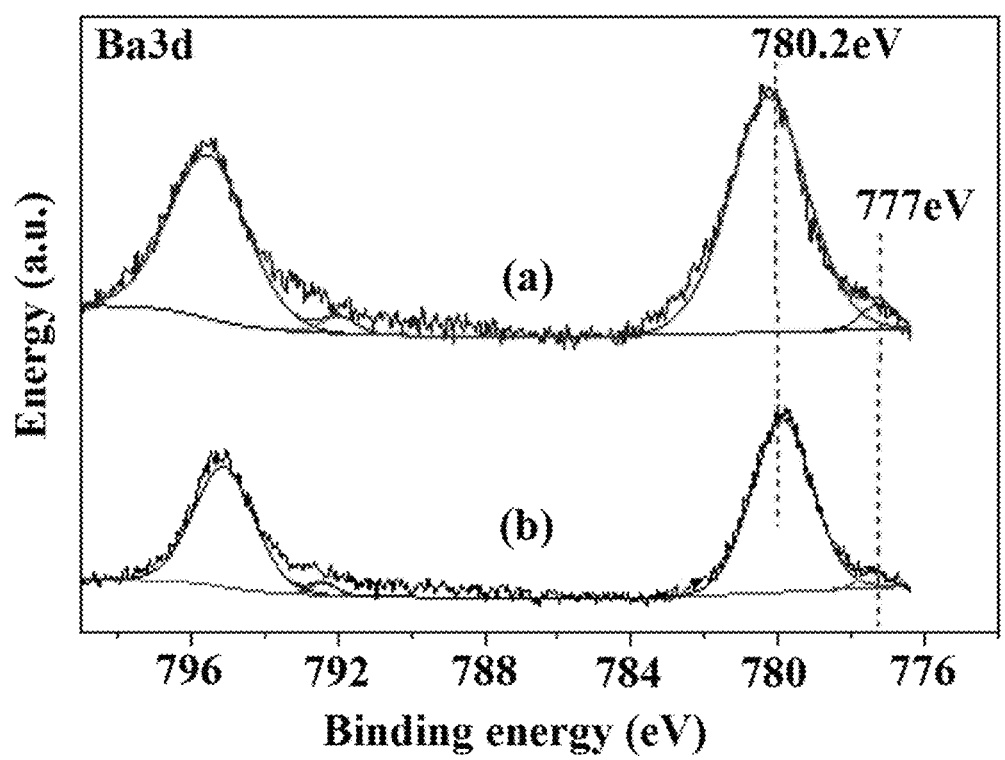
FIG. 5 shows XPS spectra of a ruthenium-based catalyst for ammonia synthesis prepared in Embodiment 1 (a) and Embodiment 11 (b) of the present invention after heating at 500° C. for 60 h.

FIG. 5 shows XPS spectra of the ruthenium-based catalyst for ammonia synthesis prepared in Embodiment 1 after heating at 500° C. for 60 h. As can be seen from FIG. 5, there are divalent barium oxide and 0-valent barium nanoparticles after the heat treatment, indicating that a small amount of barium nanoparticles are formed due to the high temperature treatment, but most of the barium still exists in the form of barium oxide.

H$_2$-TPD characterization is carried out with automatic catalyst characterization system Autochem 2910 automatic absorption instrument of Micromeritics Company in America. The detailed steps are as follows: placing 0.12 g catalyst sample in a U-shaped quartz glass reactor, raising the temperature to 500° C. with temperature programmed method and reducing the sample for 2 h with high-purity hydrogen, then purging the sample with high-purity argon at 500° C. for 2 h, then cooling to room temperature, and then performing adsorption with 30 mL/min H$^2$ gas flow at room temperature, and then blowing with high-purity argon for 30 min until the baseline is stable. Then, raising the temperature to 500° C. with temperature programmed method in high-purity argon, wherein, the reducing gas flow is 30 mL/min, and the heating rate was 10° C./min.

Figure 3:
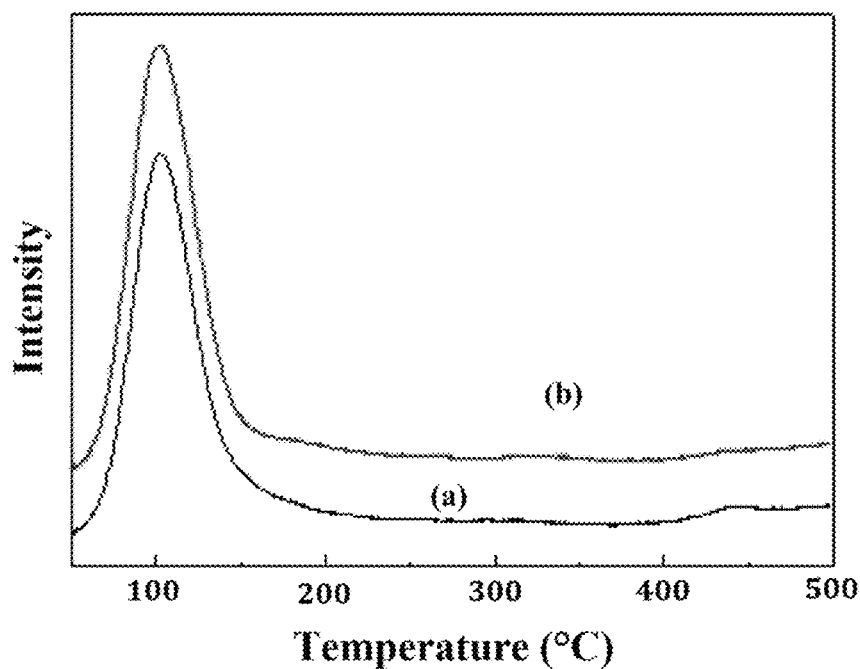
FIG. 3 shows $H_2$-TPD curves of the ruthenium-based catalyst for ammonia synthesis prepared in Embodiment 1 of the present invention before (a) and after (b) heating at 500° C. for 60 h.

FIG. 3 shows H$_2$-TPD curves of the ruthenium-based catalyst for ammonia synthesis prepared in Embodiment 1 of the present invention before (a) and after (b) heating at 500° C. for 60 h. As can be seen from FIG. 3, there are no significant change in the hydrogen adsorption strength and hydrogen adsorption capacity after the heat treatment, indicating the treating at high temperature for a long time does not lead to agglomerations of the ruthenium nanoparticles in the catalyst, and the catalyst has good structural stability.

N$_2$-TPD characterization is carried out with automatic catalyst characterization system Autochem 2910 automatic absorption instrument of Micromeritics Company in America. The detailed steps are as follows: placing 0.12 g catalyst sample in a U-shaped quartz glass reactor, raising the temperature to 500° C. with temperature programmed method and reducing the sample for 2 h in high-purity hydrogen at 30 mL/min gas flow, then purging the sample with high-purity helium gas at 500° C. for 2 h, then purging the sample with high-purity nitrogen gas to room temperature, then purging with high-purity helium gas for 30 min until the baseline is stable. Then, raising the temperature to 500° C. with temperature programmed method at a heating rate of 10° C./min in the high-purity helium gas.

Figure 4:
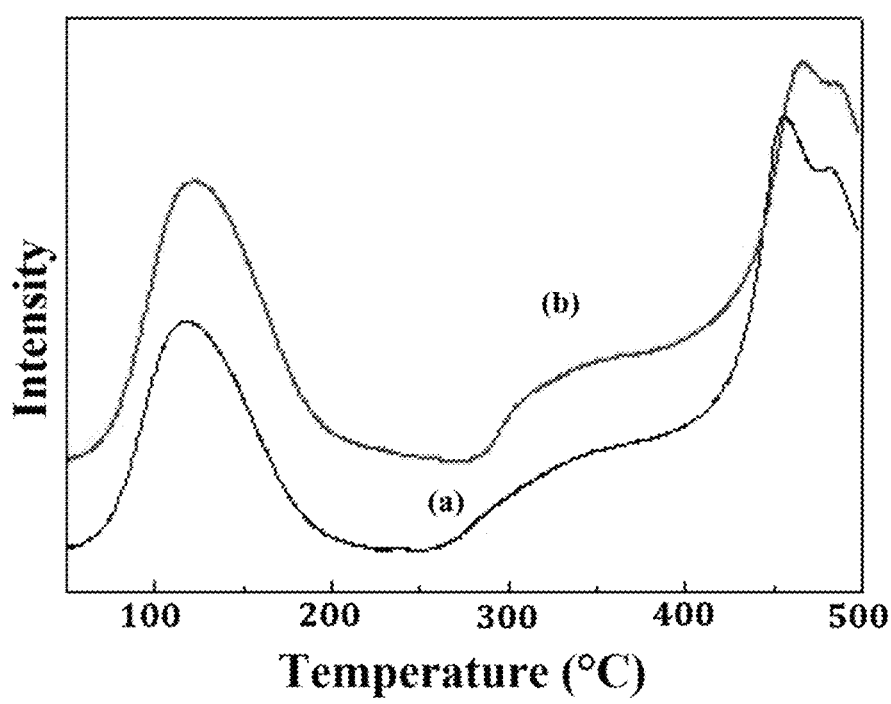
FIG. 4 shows $N_2$-TPD curves of the ruthenium-based catalyst for ammonia synthesis prepared in Embodiment 1 of the present invention before (a) and after (b) heating at 500° C. for 60 h.

FIG. 4 shows N$_2$-TPD curves of the ruthenium-based catalyst for ammonia synthesis prepared in Embodiment 1 of the present invention before (a) and after (b) heating at 500° C. for 60 h. As can be seen from FIG. 4, there are no significant change in the nitrogen adsorption strength and nitrogen adsorption capacity, indicating the treating at high temperature for a long time does not lead to agglomerations of the ruthenium nanoparticles in the catalyst, and the catalyst has good structural stability.

The CO pulse chemisorption is carried out using AutoChem 2910 full-automatic catalyst characterization system of Micromeritics company. The detailed steps are as follows: placing about 0.10 g sample in a U-shaped quartz sample tube, raising the temperature to 500° C. with temperature programmed method and pre-reducing the sample with H$_2$ for 2 h, then purging the sample with He gas for 2 h, then purging the sample to room temperature until the baseline is stable, and performing chemical adsorption. 100% CO standard gas is adopted as adsorbed gas for CO chemisorption, and pulse injection is performed until the peaks show same peak area. Then the dispersion, particle size and surface area of the metal are calculated according to the accumulated adsorption amount of the gas. The results are shown in Table 1 below.

TABLE 1

CO pulse chemisorption data of Embodiment 1 and Embodiment 10 after heating at 500° C. for 20 h

| Catalyst | Dispersion of Ru (%) | Metal Surface area (m$^2$/g catalyst) | Diameter of Ruthenium nanoparticles (nm) |
|---|---|---|---|
| Embodiment 1 | 4.18 | 0.46 | 32.0 |
| Embodiment 10 | 17.09 | 1.89 | 7.8 |

The CO chemisorption data in the table above show that, when a small amount of rare earth is added to the ruthenium-based catalyst, the dispersion of the ruthenium nanoparticles decreases greatly, but the corresponding activity of the catalyst does not change much, indicating that the ruthenium nanoparticles are covered by oxide to form a certain core-shell structure, which improves the stability of the catalyst without affecting the activity of the catalyst. The diameter of ruthenium nanoparticle is a calculated value in the table, which is much larger than the size observed in the TEM images due to the coving of ruthenium nanoparticles.

Test Example 2

Catalytic performance and stability performance of the ruthenium-based catalysts for ammonia synthesis prepared in the above embodiments and comparative examples are tested, and the results are shown in Table 2 below.

Test of catalytic performance: carrying out ammonia synthesis at the following conditions: ratio of $H_2$ to $N_2$ in a coal gas is 3:1, CO content is 20 ppm, reaction temperature is 400° C., space velocity is 10000 h$^{-1}$, and the pressure is 10 MPa. Ammonia concentration at the reactor outlet is tested.

Test of stability performance: carrying out ammonia synthesis at the following conditions: ratio of $H_2$ to $N_2$ in a coal gas is 3:1, CO content is 20 ppm, and prior to synthesis the catalyst is heat treated at 500° C. for 60 h. The reaction temperature is 400° C., space velocity is 10000 h$^{-1}$, and the pressure is 10 MPa. Ammonia concentration at the reactor outlet is tested.

TABLE 2

Results of test of catalytic performance of ruthenium-based catalysts for ammonia synthesis prepared in the embodiments and comparative examples

| | Ammonia concentration % | Ammonia concentration obtained in test of stability performance % |
|---|---|---|
| Embodiment 1 | 21.2 | 22.3 |
| Embodiment 2 | 21.3 | 21.6 |
| Embodiment 3 | 21.1 | 22.5 |
| Embodiment 4 | 20.5 | 22.9 |
| Embodiment 5 | 21.3 | 21.5 |
| Embodiment 6 | 20.5 | 22.7 |
| Embodiment 7 | 21.2 | 22.1 |
| Embodiment 8 | 20.8 | 21.3 |
| Embodiment 9 | 20.9 | 21.9 |
| Embodiment 10 | 21.8 | 22.1 |
| Embodiment 11 | 21.9 | 22.6 |
| Embodiment 12 | 20.8 | 21.7 |
| Comparative example 1 | 19.6 | 18.3 |
| Comparative example 2 | 19.2 | 17.6 |
| Comparative example 3 | 20.0 | 18.5 |
| Comparative example 4 | 18.9 | 17.5 |

The data in the table above indicated that the ruthenium-based catalysts for ammonia synthesis of the present invention have improved catalytic performance and stability. This is because that the catalysts of the present invention comprise Ru—Ba-A core-shell structure wherein ruthenium nanoparticles forms core covered with barium nanoparticles and metal oxides from inside to outside, thereby effectively preventing agglomeration of the ruthenium nanoparticles in the catalyst during the use of the catalyst.

Obviously, the embodiments described above are merely examples for clear description, and are not intended to limit the implementations. Other variations or modifications of the various forms may also be made by those skilled in the art based on the above description. There is no need and no way to exhaust all of the implementations here. Obvious variations or modifications derived therefrom are still within the protection scope of the invention-creation.

We claim:

1. A ruthenium-based catalyst for ammonia synthesis, comprising Ru—Ba-A core-shell structure, the Ru—Ba-A core-shell structure comprising a ruthenium nanoparticle as a core which is covered with a first shell and a second shell sequentially, wherein the first shell consists of a barium nanoparticle, and the second shell consists of a metal oxide;
wherein the support member is a graphitized activated carbon support; and the electron promoter is an oxide of an alkali metal;
the ruthenium-based catalyst is Ru—Ba-A-L/GC, wherein Ru represents a ruthenium nanoparticle, Ba represents a barium nanoparticle, A represents a metal oxide, L represents an electron promoter, GC represents a graphitized activated carbon support, and L/GC represents a composite support;
the metal oxide is barium oxide or a mixture of barium oxide and oxide MO$_X$, wherein M is a metal except for barium, and X is 1-2;
the oxide MO$_X$ is at least one selected from the group consisting of $ZrO_2$, $TiO_2$, MgO, ZnO, $CeO_2$, $Al_2O_3$, $La_2O_3$ and $Sm_2O_3$.

2. The ruthenium-based catalyst of claim 1, further comprising a composite support which comprises a support member having an electron promoter dispersed on a surface of the support member, and the Ru—Ba-A core-shell structure being supported on the composite support.

3. The ruthenium-based catalyst of claim 2, wherein based on mass of the support member, the ruthenium nanoparticle accounts for 3 wt. % to 5 wt. %, metal ions in the barium nanoparticle and metal oxide account for 3 wt. % to 20 wt. %, and metal ions in the electron promoter account for 3 wt. % to 10 wt. %.

4. The ruthenium-based catalyst of claim 3, wherein the electron promoter is $K_2O$.

5. The ruthenium-based catalyst of claim 4, wherein the core has an average diameter of 2 nm to 5 nm, and the first shell and second shell have a total average thickness of 1 nm to 2 nm; and wherein the graphitized activated carbon support has a specific surface area of 800 m$^2$/g to 1500 m$^2$/g and a pore volume of 0.4 cm$^3$/g to 0.8 cm$^3$/g.

6. A method for preparing the ruthenium based catalyst of claim 1 for ammonia synthesis, comprising the following steps:
impregnating a support member with a mixed aqueous solution of a ruthenium precursor, a soluble salt of a metal and a soluble salt of an electron promoter, and taking out the impregnated support member after the impregnating is completed; and
successively drying and calcinating the impregnated support member in a reducing atmosphere to obtain a ruthenium-based catalyst for ammonia synthesis.

7. The method of claim 6, wherein the impregnating is incipient impregnation carried out at a temperature of 20° C. to 60° C.;
the drying is carried out at a temperature of 110° C. to 120° C.; and
the calcinating comprises heating the impregnated support member after drying from a temperature of 110° C. to 120° C. to a temperature of 500° C. to 900° C. at a heating rate of 2-10° C./h, and then calcinating at 500° C. to 900° C.

8. The method of claim 7, wherein the calcinating lasts for 1 h to 60 h.

9. The method of claim 8, wherein the reducing atmosphere is a coal gas atmosphere comprising CO and CO$_2$ at a concentration of 5 ppm to 20 ppm; and
the mixed aqueous solution has a pH value of 0-2.

10. The method of claim 8, wherein every 100 g of the mixed aqueous solution contains 1-4 g ruthenium ions, and a mass ratio of the ruthenium ions to metal ions in the soluble salt of a metal oxide to metal ions in the soluble salt of the electron promoter is 1:(1.2 to 1):10.

11. The method of claim 7, wherein the reducing atmosphere is a coal gas atmosphere comprising CO and CO$_2$ at a concentration of 5 ppm to 20 ppm; and
the mixed aqueous solution has a pH value of 0-2.

12. The method of claim 7, wherein every 100 g of the mixed aqueous solution contains 1-4 g ruthenium ions, and a mass ratio of the ruthenium ions to metal ions in the soluble salt of a metal oxide to metal ions in the soluble salt of the electron promoter is 1:(1.2 to 1):10.

13. The method of claim 7, wherein the method further comprises an aging step after the impregnating and prior to the drying, and the aging step is carried out at a temperature of 20° C. to 30° C. for a period of 2 h to 12 h.

14. The method of claim 12, wherein the pH value of the mixed aqueous solution is adjusted with one or more acids selected from the group consisting of nitric acid, acetic acid, oxalic acid, citric acid and tartaric acid;
and/or, the ruthenium precursor is a chlorine-free water-soluble ruthenium precursor selected from the group consisting of ruthenium acetate, ruthenium nitrosyl nitrate, ruthenium ammonia complex and any combination thereof;
and/or, the soluble salt of the metal and the soluble salt of the electron promoter are both selected from the group consisting of nitrate, acetate, citrate, oxalate and any combination thereof.

* * * * *